United States Patent [19]

Goldman

[11] Patent Number: 5,306,108
[45] Date of Patent: Apr. 26, 1994

[54] SELF-SEALING WASHERS

[75] Inventor: Sidney Goldman, Boca Raton, Fla.

[73] Assignee: Mechanical Manufacturing Corp., Sunrise, Fla.

[21] Appl. No.: 95,577

[22] Filed: Jul. 19, 1993

[51] Int. Cl.⁵ .................. F16B 33/00; F16B 43/02
[52] U.S. Cl. .................. 411/369; 411/542; 411/915
[58] Field of Search .......... 411/369, 542, 544, 915; 285/220; 277/207 R, 208, 209, 214

[56] References Cited

U.S. PATENT DOCUMENTS

| | | | |
|---|---|---|---|
| 4,280,390 | 7/1981 | Murray | 411/542 |
| 5,011,162 | 4/1991 | Jelinek | 411/369 X |
| 5,188,495 | 2/1993 | Jones, Jr. | 411/542 X |
| 5,201,625 | 4/1993 | Takenouchi et al. | 411/369 |

FOREIGN PATENT DOCUMENTS 1003669  1/1977  Canada ................. 411/369

Primary Examiner—Neill R. Wilson
Attorney, Agent, or Firm—Sachs & Sachs

[57] ABSTRACT

A self-sealing washer for use on a fluid containing housing includes a semi-rigid circular member having a horizontal portion and a relatively short vertical portion disposed at the distal edge thereof suitable to be received into a channel provided on a flat surface of the housing. The horizontal portion of the circular member includes a centrally disposed through aperture to receive the screw therein, the screw has a relatively large head portion. A first elevation portion is provided on the circular member which is disposed remote from the distal edge and a second elevation portion generally centrally disposed within the first elevation portion which terminates in a relatively sharp edge. Preferably the second elevation portion is higher than the first elevation portion.

13 Claims, 2 Drawing Sheets

SELF-SEALING WASHERS

BACKGROUND OF THE INVENTION

1. Field of the Invention

The present invention relates to washers, and more particularly, to a self-sealing washer suitable for use on a fluid containing housing.

2. Discussion of the Relevant Art

The art abounds with numerous washers used for retaining a screw or bolt within its threaded hole during shock, continuous vibrations and humidity in the atmosphere so that the atmosphere does not penetrate the inner part of the housing on which it is used. Alternatively, washers have been proposed to seal a liquid or fluid containing housing so that there is no seepage out of the screw holes placed in the sealing cover.

U.S. Pat. No. 4,663,910, issued on May 12, 1987, to screw. The rib appears to form a sharp edge.

U.S. Pat. No. 1,481,515, issued on Jan. 22, 1924, to H. P. Kraft, discloses a corrugated washer. The corrugations of course appear on both sides of the washer however they are not successful at sealing liquids from seeping out of the screw hole.

U.S. Pat. No. 4,715,756, issued on Dec. 29, 1987, to Danico, et al., discloses a nut and washer type fastener with the washer member having a skirt portion and an end portion into which a nut member is secured. A collar section connects the skirt portion to the end portion. The collar section is designed to fracture at a predetermined torque load and is contrary to the teachings of the instant invention.

The instant invention overcomes the shortcomings known in the art by providing a seal between the screw head and the housing in addition to a seal around the opening into which the screw is threaded thereby preventing any leakage to the outside atmosphere, which has not been accomplished until the present invention.

SUMMARY OF THE INVENTION

Therefore, it is the object of the present invention to provide a self-sealing washer which is capable of preventing fluids from escaping from a threaded hole and screw threaded therein.

It is another object of the present invention to provide an inexpensive self-sealing washer.

It is yet another object of the present invention to provide a semi-rigid type of washer that may be used to seal a threaded screw hole by cooperating with the underside of the screw head and the mounting surface of a cover, which the threaded screw holds in place.

It is yet another object of the present invention to provide an integrated sealing washer, which may be provided by an automatable process.

Other objects and purposes of the invention will be apparent to users acquainted with the problem of sealing fluid containing housings upon reading the following specification and inspecting the accompanying drawings.

A self-sealing washer for use on a fluid containing housing includes a semi-rigid circular member having a horizontal portion and a relatively short vertical portion, disposed at the distal edge thereof, suitable to be received into a channel provided on a flat surface of the housing cover. The horizontal portion is provided with a centrally disposed through aperture adapted to receive a screw therein; the screw has a relatively large head portion. The horizontal portion also includes a first elevation portion disposed remote from the distal edge thereof and second elevation portion generally centrally disposed within the first elevation portion. The second elevation portion preferably is higher then the first elevation portion and terminates in a relatively sharp edge.

The foregoing and other objects and advantages will appear from the description to follow. In the description reference is made to the accompanying drawing, which forms a part hereof, and in which is shown by way of illustration, specific embodiments in which the invention may be practiced. These embodiments will be described is sufficient detail to enable those skilled in the art to practice the invention, and it is to be understood that other embodiments may be utilized and that the structural changes may be made without departing from the spirit and scope of the invention. The following detailed description is, therefore, not to be taken in a limiting sense, and the scope of the present invention is best defined by the appended claims. For convenience like numerals are utilized for like members or features shown in both embodiments.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENTS

Figure 1:
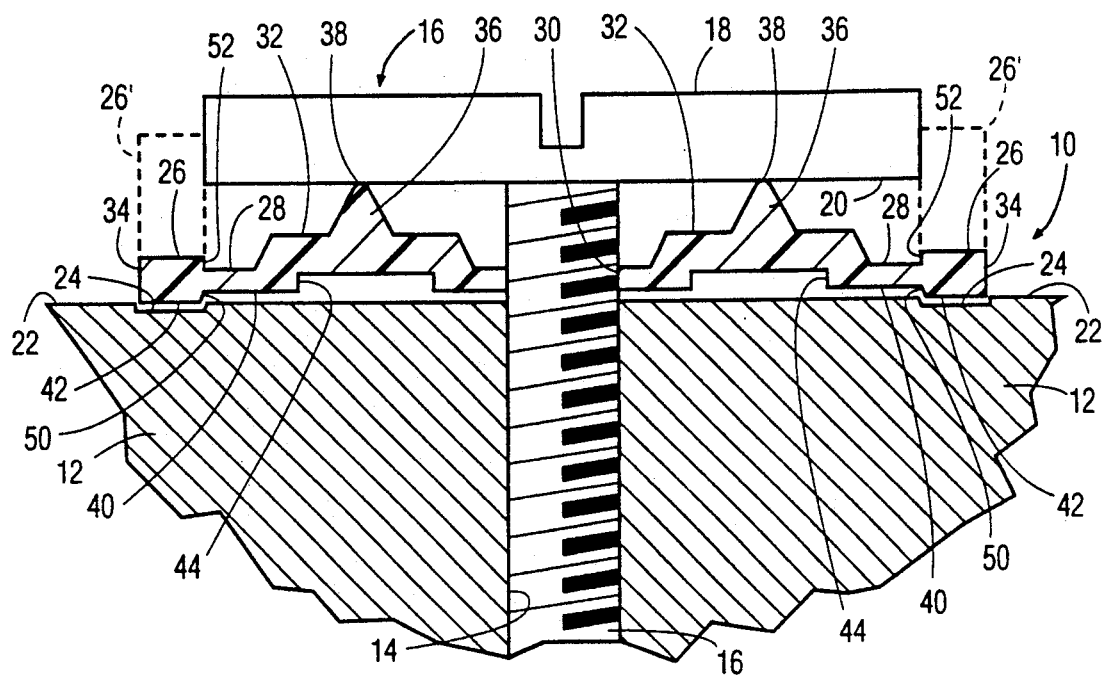
FIG. 1 is an enlarged cross section of the self-sealing washer for use on a fluid containing housing, according to the principles of the present invention.
Figure 3:
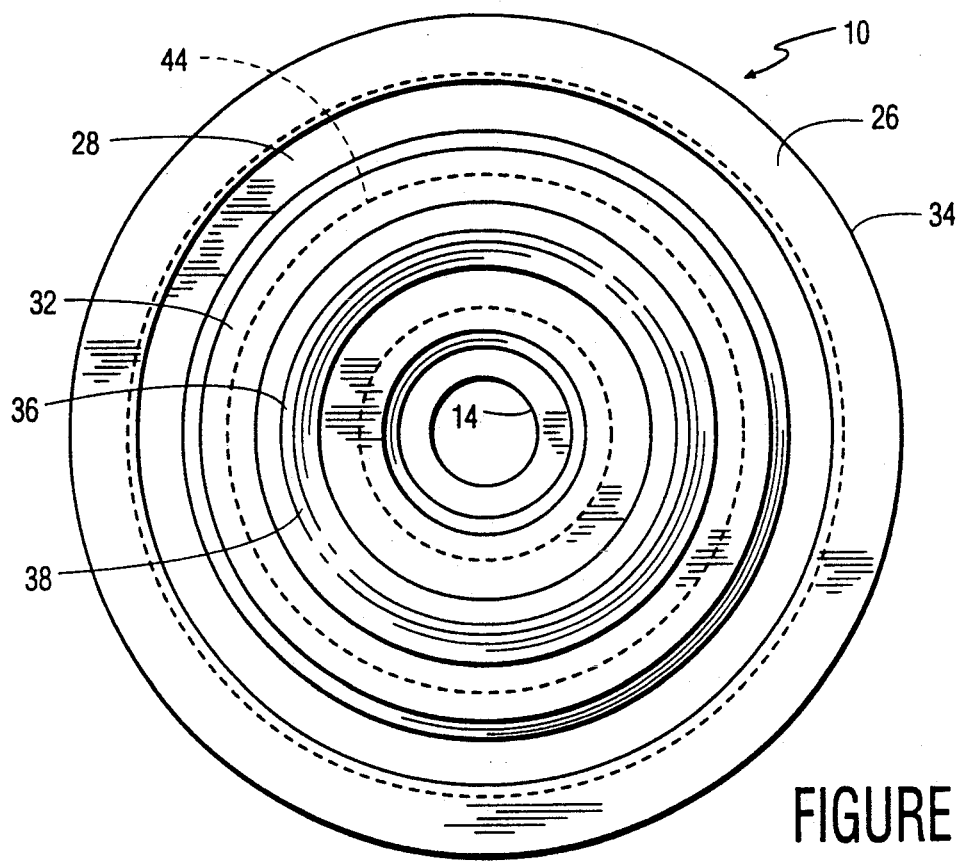
FIG. 3 is a top plan view of the embodiment shown in FIG. 1.

Referring now to the Figures, and in particular to FIGS. 1 and 3, there is shown a self-sealing washer 10 used on a fluid containing housing cover 12 which is provided with a clearance aperture 14 that cooperates with a threaded aperture disposed in a housing, not shown, that is adapted to receive a threaded screw 16 therein. The screw 16 is provided with a relatively large head portion 18 having a generally flat under surface 20 and an elongated threaded portion 22. The screw 16 is adapted to be received into the clearance aperture 14 and the threaded housing aperture with the self-sealing washer 10 being disposed between the head 18 of the screw 16 and the surface 22 of the housing cover 12. The surface 22 of the housing cover 12 is provided with a circular channel 24 that is adapted to cooperate with a short vertical portion 26 provided on the distal edge 34 of the self-sealing washer 10. The self-sealing washer 10 is preferably made from a semi-rigid material such as Teflon, Nylon, etc. and has a horizontal portion 28 provided with a centrally disposed through aperture 30 and a first elevation portion 32 disposed remote from the distal edge 34 of the self-sealing washer 10. Disposed within the first elevation portion 32 is a second elevation portion 36, which terminates in a relatively sharp edge 38 that contacts the under surface 20 of the screw head 18. Preferably the height of the short vertical portion 26 is greater than the height of the second elevation portion 36, as shown by the broken lines 26'.

However, the height of the short vertical portion 26 may be smaller than the height of he second elevation portion 36. It also follows that the height of the short vertical portion may be equal to the height of the second elevation portion.

The under surface 40 of the self-sealing washer 10 has a relatively small portion 42, which is adapted to be received into a channel 24 and under pressure is caused to move in an outwardly direction, as will be explained hereinafter. The circular channel 44 is chosen to permit the second elevation portion 36 to deflect therein when pressure is exerted thereon by the head 18 of the screw 16.

Figure 2:
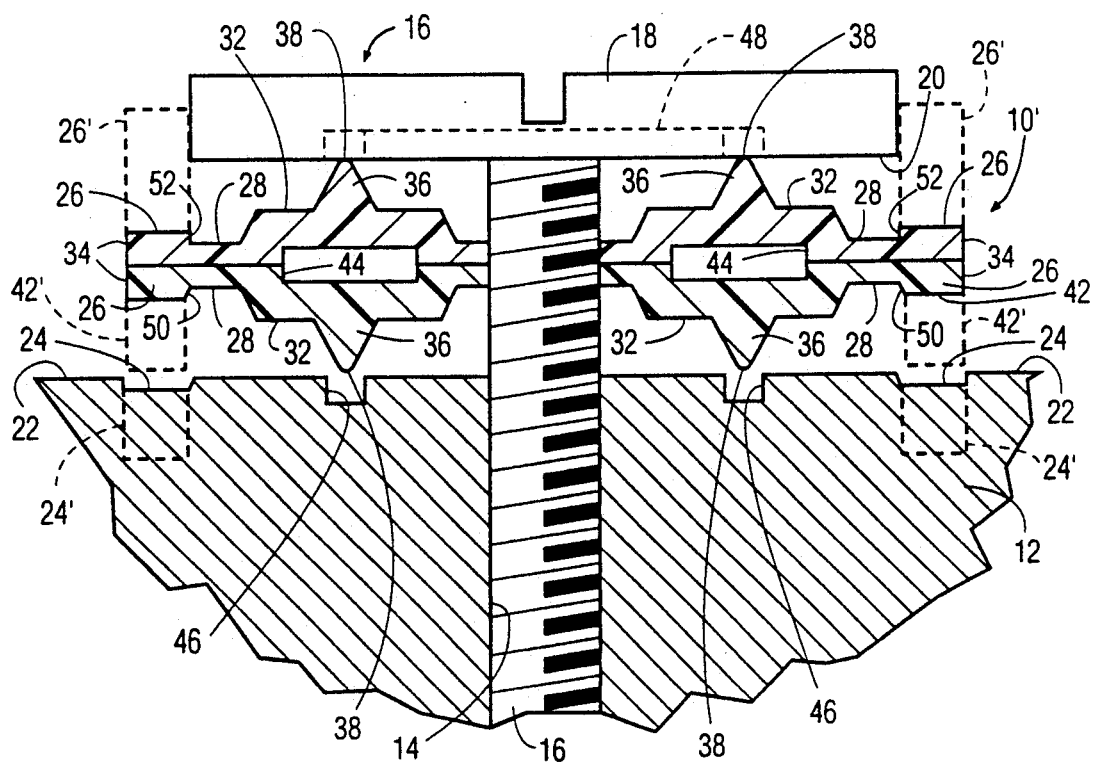
FIG. 2 is an alternate embodiment of a self-sealing washer.
Figure 4:
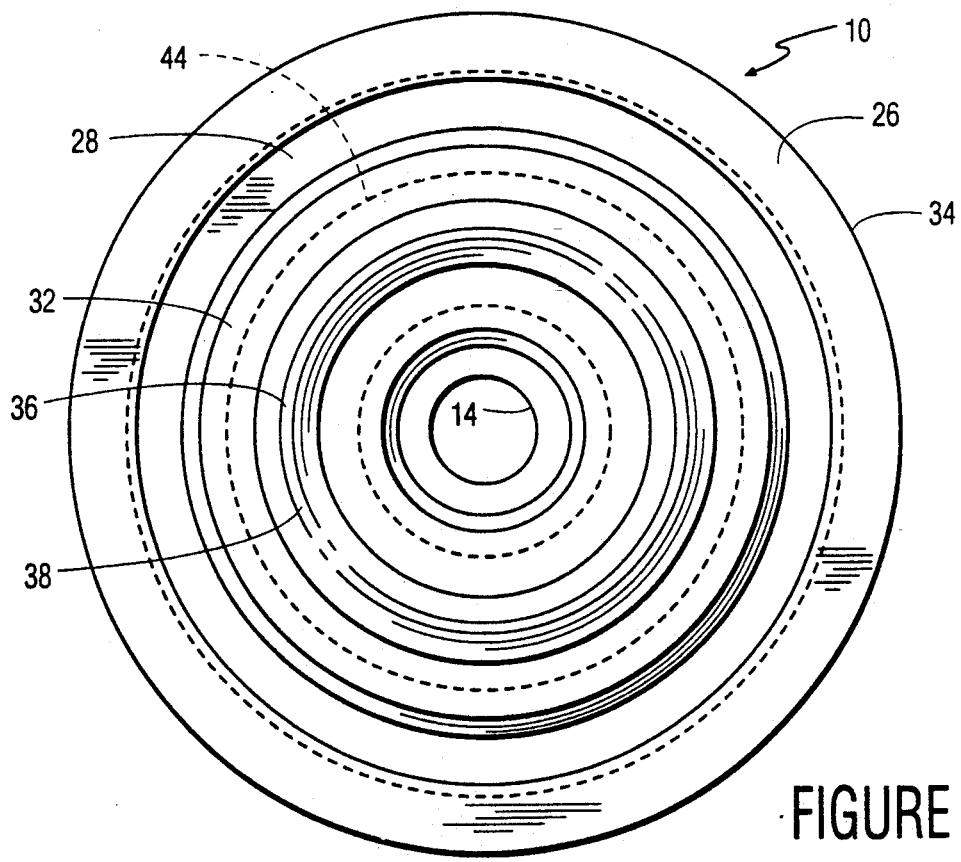
FIG. 4 is a top plan view of the embodiment shown in FIG. 2.

Referring now to FIGS. 2 and 4, wherein like numerals have been utilized for like components and features. The cross-sectional view of FIG. 2 is very similar to the cross-section shown in FIG. 1, as will become obvious. The self-sealing washer 10 in effect may be made by utilizing two separate washers, one inverted from the other, so that they form a mirror image, or alternatively, may be made as a single component. An additional channel 46 circular in shape is provided in the flat surface 22 of the housing cover 12 in order to receive the relatively thin end 38 of the second elevation portion 36. If desired, a channel 48 may be provided in the head portion 18 of screw 16 so that it may receive the relatively sharp or thin edge 38 of the second elevation portion 36 appearing on the upper or top surface of the washer 10 in the same manner that the relatively sharp or thin edge 38 is received into the channel 46. It can be seen that self-sealing washer 10' is identical to self-sealing washer 10, shown in FIG. 1, and includes two of them, or alternatively, self-sealing washer 10' may be fabricated as a single unitary component or element, as noted previously.

The washers 10 and 10' function in the same manner as will be described hereinafter. Either washer 10 or 10' is placed between the head 18 of screw 16 and the flat surface 22 of the housing cover 12. As the screw 16 is threaded into the aperture 14 the head 18 thereof exerts pressure on the relatively thin edge(s) 38 thereby deforming the second elevation portion 36 and flexing or bending this area into the channel 44, thereby providing a thorough seal of any fluid which may seep up to the surface 22, via the aperture 14. Any seepage which occurs beneath the washer 10 will be stopped at the vertical portion 26, or 26' which is received into the channel 24 or 24'. With the pressure exerted on the relatively thin edge(s) 38 of washers 10 and/or 10' the vertical portions 26 will flex in an outwardly direction thereby providing a perfect seal preventing any seepage beyond the washer. The embodiment shown in FIG. 2 provides a second seal at the channel 46, which receives the relatively thin edge 38 of the second elevation 36. It is obvious that a second channel, not shown, may be provided in the screw head 16 to receive the vertical portion 26 therein providing a double seal also. Preferably the head of the screw will be captured by the vertical inner wall 52 of the vertical portion 26. Vertical portion 26 on the inner circumference may be provided with a sloping inner side wall 50 that could move in an outwardly direction if a channel, not shown, is provided in the head portion 18 of the screw 16.

Hereinbefore has been disclosed two embodiments of a self-sealing washer for use on a fluid containing housing. It will be understood that various changes in the details, materials, arrangement of parts and operation conditions, which have been herein described and illustrated in order to explain the nature of the invention may be made by those skilled in the art within the principal and scope of the instant invention.

Having thus set forth the nature of the invention, what is claimed is:

1. A self-sealing washer for use on a fluid containing housing cover comprising:

a semi-rigid circular member having a horizontal portion and a relatively short vertical portion extending above and below said horizontal portion disposed at the distal edge thereof, suitable to be received into a channel provided on a flat surface of said housing cover, said horizontal portion being provided with;
 i) a centrally disposed through aperture adapted to receive a screw therein, said screw having a relatively large head portion,
 ii) a first elevation portion disposed remote from said distal edge having a channel disposed therein on the underside thereof, and
 iii) a second elevation portion generally centrally disposed within said first elevation portion, said second elevation portion terminating in a relatively sharp edge.

2. A self-sealing washer according to claim 1, wherein the height of said relatively short vertical portion is greater than the height of said second elevation portion.

3. A self-sealing washer according to claim 1, wherein the height of said relatively short vertical portion is equal to the height of said second vertical portion.

4. A self-sealing washer according to claim 1, wherein said relatively short vertical portion is provided with an inner wall that is sloped outwardly so that upon compression by the head portion of said screw said relatively short second vertical portion moves in an outwardly direction sealing said channel provided on said housing cover flat surface.

5. A self-sealing washer according to claim 1, wherein said second elevation portion collapses when the head portion of said screw is threaded into a threaded hole provided in said housing cover flat surface providing a second seal for said housing cover and preventing fluid from seeping out of said threaded screw hole provided in said housing cover.

6. A self-sealing washer means according to claim 1 wherein said second elevation portion is higher than said first elevation portion.

7. A self-sealing washer for use on a fluid containing housing cover comprising:

a) a top surface, said top surface being provided with a semi-rigid circular portion having a flat portion and a relatively short vertical portion extending above and below said horizontal portion disposed at the distal edge thereof adapted to receive the head of a screw therein, said flat portion being provided with;
 i) a centrally disposed through aperture adapted to receive said screw therein, said screw having a relatively large head portion,
 ii) a first elevation portion disposed remote from said distal edge having a channel disposed therein on the underside thereof, and
 iii) a second elevation portion generally centrally disposed within said first elevation portion, said second elevation portion terminating in a relatively sharp edge; and b) a bottom surface, said bottom surface being provided with a semi-rigid circular portion having a flat portion and a relatively short vertical portion disposed at the distal edge thereof adapted to be received into a first channel provided on a flat surface of said housing cover, said flat portion being provided with;
  i) a centrally disposed through aperture adapted to receive the threaded portion of said screw therein,
  ii) a third elevation portion disposed remote from said distal edge, and
  iii) a fourth elevation portion generally centrally disposed within said third elevation portion, said fourth elevation portion terminating in a relatively sharp edge, which is adapted to be received into a second channel provided in the flat surface of said housing cover.

8. A self-sealing washer according to claim 7, wherein the height of said relatively short vertical portion is greater than the height of said second and fourth elevation portions.

9. A self-sealing washer according to claim 7, wherein the height of said relatively short vertical portion is equal to the height of said second fourth vertical portions.

10. A self-sealing washer according to claim 7, wherein said relatively short vertical portion is provided with an inner wall that is sloped outwardly so that upon compression by the head portion of said screw said relatively short second vertical portion moves in an outwardly direction sealing said first channel provided on said housing cover flat surface.

11. A self-sealing washer according to claim 7, wherein said fourth elevation portion is received by a second channel and collapses when the head portion of said screw is threaded into a threaded hole provided in said housing cover flat surface providing a second seal for said housing cover and preventing fluid from seeping out of said threaded screw hole provided in said housing cover.

12. A self-sealing washer means according to claim 7, wherein said top surface and said bottom surface are made as two separate components.

13. A self-sealing washer means according to claim 7 wherein said second portion and said forth portion are higher than said first portion and said third portion, respectively.

* * * * *